United States Patent [19]
Toyonaga et al.

[11] Patent Number: 4,689,785
[45] Date of Patent: Aug. 25, 1987

[54] DATA TRANSMISSION SYSTEM

[75] Inventors: Kenji Toyonaga; Yoshihito Higashitsutsumi; Akihiro Yanai, all of Gifu, Japan

[73] Assignee: Sanyo Electric Co., Ltd., Osaka, Japan

[21] Appl. No.: 775,565

[22] Filed: Sep. 13, 1985

[30] Foreign Application Priority Data

Sep. 14, 1984 [JP] Japan .................... 59-193314
Sep. 28, 1984 [JP] Japan .................... 59-204731
Oct. 18, 1984 [JP] Japan .................... 59-219934
Jan. 8, 1985 [JP] Japan .................... 60-1111

[51] Int. Cl.$^4$ .................... H04J 3/02; H04J 3/24
[52] U.S. Cl. .................... 370/85; 370/94
[58] Field of Search ............ 370/85, 94, 89, 110.1; 340/825–852

[56] References Cited

U.S. PATENT DOCUMENTS 4,332,027 5/1982 Malcolm et al. .................. 370/94
4,342,995 8/1982 Shima ............................ 370/94
4,399,531 8/1983 Grande et al. .................. 370/94
4,451,827 5/1984 Kahn et al. ..................... 370/94

FOREIGN PATENT DOCUMENTS

58-45059 10/1983 Japan .
59-139784 8/1984 Japan .

Primary Examiner—Douglas W. Olms
Assistant Examiner—Frank M. Scutch, III
Attorney, Agent, or Firm—Armstrong, Nikaido, Marmelstein & Kubovcik

[57] ABSTRACT

A data transmission system having a plurality of stations and bus structure connected among the stations for sending an information data or an answer back data in a packet from one station to another station through the bus structure. Each station has a receiver which receives the packet and detects that the packet of information data is directed to the station by identifying the address data. If it is so detected that the packet is directed to this station, an acknowledge signal is produced. A carrier sensor is provided for producing a presence signal indicative of the presence of the packet on the bus structure. A counter starts to count time when the presence signal disappears, and produces first and second time-up signals after the lapse of first and second predetermined times, respectively, provided that the first predetermined time is shorter than the second predetermined time. A transmitter prepares the packet of answer back data in response to the receipt of the acknowledge signal and transmits the prepared answer back data after the counter has counted the first predetermined time and before the end of the second predetermined time.

16 Claims, 20 Drawing Figures

DATA TRANSMISSION SYSTEM

BACKGROUND OF THE INVENTION

1. Field of the invention

The present invention relates to a data transmission system for transmitting data in packets and used in the field of, for example, office automation system, factory automation system, home automation system, or the like.

2. Description of the Prior Art

The data transmission system which the present invention is involved is used, for example, in a remote control system for controlling various equipment and appliances, such as, lights, and air conditioners. The system includes, e.g., a number of stations in which one station may be designated as a center. The stations are connected to each other by a common bus line. The data transmission may be carried out from one station to another station, or from one station to a plurality of stations, simultaneously. To carry out the system with the least error operations as possible, it is very important to acknowledge, at the sending station, that the information data is correctly sent to the required station(s). To this end, the receiving station sends back an answer-back through the same bus line to the sending station where the information data was sent.

The sending of the information data along the bus line to a destination station is done such that the information data is combined with other data, such as address data, error check data, etc. The combined data is generally referred to as a packet. Also, when sending the data along the bus line, a predetermined time interval is necessary between packets so as to prevent any interference between the data, as discussed in Japanese Utility Model application No. 58-196415 or in Japanese Patent Publication (examined) No. 58-45059.

According to the prior art system, the answer-back contains the same information data as that was sent to the receiving station. Thus, at the sending station, an information data storage is provided for temporarily storing the information data to be sent, and also a comparator is provided for comparing the stored data with the information data contained in the answer-back. Therefore, each station must have the information data storage and the comparator, which will result in a bulky station and a high manufacturing cost.

SUMMARY OF THE INVENTION

The present invention has been developed with a view to substantially solving the above described disadvantages and has for its essential object to provide an improved data transmission system which can acknowledge the receipt of the transmitted data without using the information data storage and the comparator.

It is also an essential object of the present invention to provide a data transmission system of the above described type which can send the same data to a plurality of stations at the same time simply.

It is a further object of the present invention to provide a data transmission system in which the received data and the reading pulse generated in the receiving station can be synchronized rapidly in a simple manner.

It is yet another object of the present invention to provide a data transmission system in which the synchronization which has been taken between the received data and the reading pulse generated in the receiving station can be maintained with a high reliability.

In accomplishing these and other objects, a data transmission system has a plurality of stations and bus structure connected among the stations for sending an information data or an answer back data in a packet from one station to another station through the bus structure. According to the present invention, each station has a receiver which receives the packet and detects that the packet of information data is directed to the station by identifying the address data. If it is so detected that the packet is directed to this station, an acknowledge signal is produced. A carrier sensor is provided for producing a presence signal indicative of the presence of the packet on the bus structure. A counter starts to count time when the presence signal disappears, and produces first and second time-up signals after the lapse of first and second predetermined times, respectively, provided that the first predetermined time is shorter than the second predetermined time. A transmitter prepares the packet of answer back data in response to the receipt of the acknowledge signal and transmits the prepared answer back data after the counter has counted the first predetermined time and before the end of the second predetermined time.

BRIEF DESCRIPTION OF THE DRAWINGS

These and other objects and features of the present invention will become apparent from the following description taken in conjunction with a preferred embodiment thereof with reference to the accompanying drawings, throughout which like parts are designated by like reference numerals, and in which.

DESCRIPTION OF THE PREFERRED EMBODIMENTS

Figure 1:
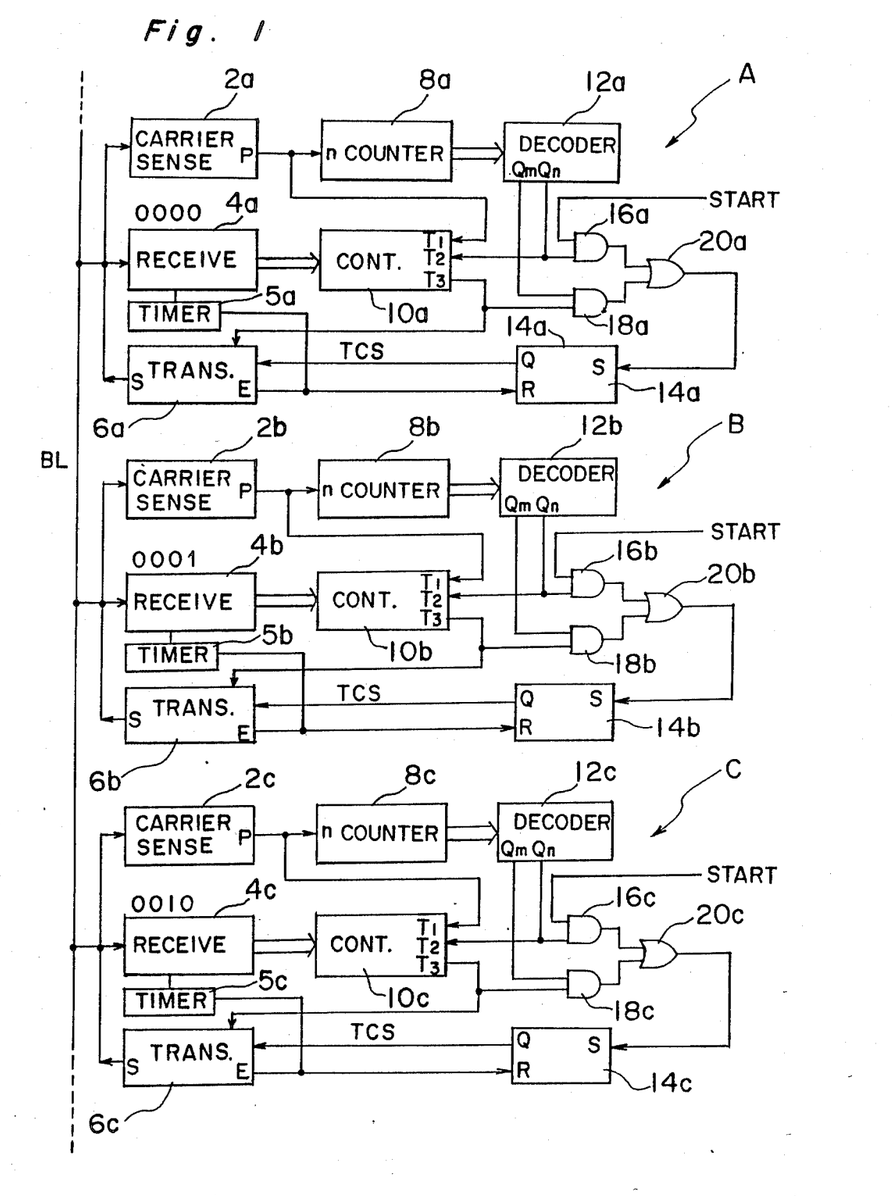
FIG. 1 is a block diagram of a data transmission system of the present invention.

Referring to FIG. 1, a data transmission system according to the present invention is shown, which comprises a number of stations A, B, C, and so on, which are connected to each other by a bus line BL. It is to be noted that one of the stations may serves as a center station. The data is transmitted from one station to another station or stations by a packet which will be described in detail later in connection with FIGS. 4–9.

Each station, such as station A comprises a carrier sensor 2a which detects a packet and produces a HIGH level signal from its output P when a packet is present on the bus line. The output P of carrier sensor 2a is connected to a modulo-n counter 8a and also to an input T1 of control circuit 10a. Counter 8a is reset in response to the leading edge of the pulse produced from the output P that is at the beginning of the packet and, starts to count up in response to the trailing edge of the same pulse from the output P, that is at the end of the packet.

Modulo-n counter 8a is connected to a decoder 12a which has outputs Qm and Qn. Output Qm produces a HIGH level pulse when counter 8a has counted to a value m, and output Qn produces a HIGH level pulse when counter 8a has counted to a value n, in which n is greater than m. After having counted up to n, counter 8a is maintained in the n counted position until it is reset again. Thus, after counting up to n, output Qn continues to produce the HIGH level signal until counter 8a is reset, that is until the beginning of the next packet. Output Qm is connected to an AND gate 18a, and output Qn is connected to an AND gate 16a, and also to input T2 of control circuit 10a. AND gate 16a is also connected to a switch (not shown) which produces a start signal. AND gate 18a is also connected to an output T3 of control circuit 10a.

The outputs of AND gates 16a and 18a are connected to an OR gate 20a which is in turn connected to a set terminal S of a flip-flop 14a. A Q output and a reset terminal R of flip-flop are connected to a data transmitter 6a.

Figure 6:
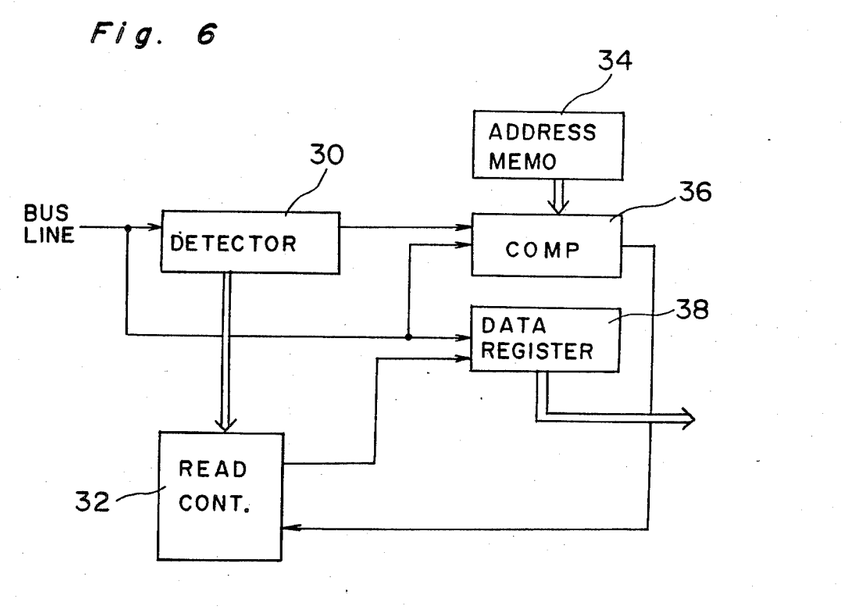
FIG. 6 is a circuit diagram of a receiving portion for receiving packets shown in FIGS. 4 and 5.

A receiver 4a is connected to a control circuit 10a. As shown in FIG. 6, receiver 4a as an address memory 34, in which a particular address is stored. For example, as indicated in FIG. 1, stations A, B and C are stored with addresses 0000, 0001 and 0010, respectively. A timer 5a is connected between receiver 4a and data transmitter 6a for counting a time interval between the trailing edge of the data sent from the station A and the leading edge of the next data received at receiver 4a. Carrier sensor 2a, receiver 4a and data transmitter 6a are connected to bus line BL.

It is to be noted that stations B and C has the same structure as the one described above.

Figure 2A:
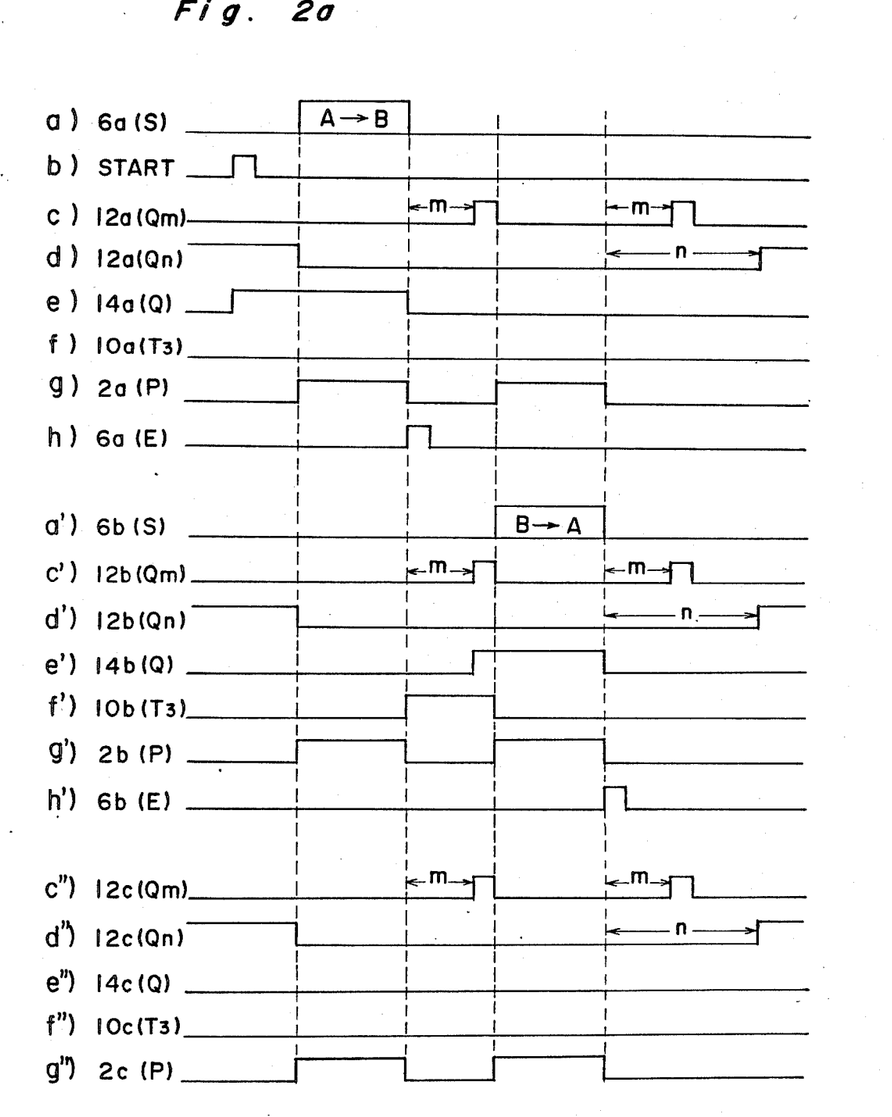
FIG. 2a is a graph showing waveforms obtained in the block diagram of FIG. 1 wherein the data is transmitted properly.
Figures 2B, 3:
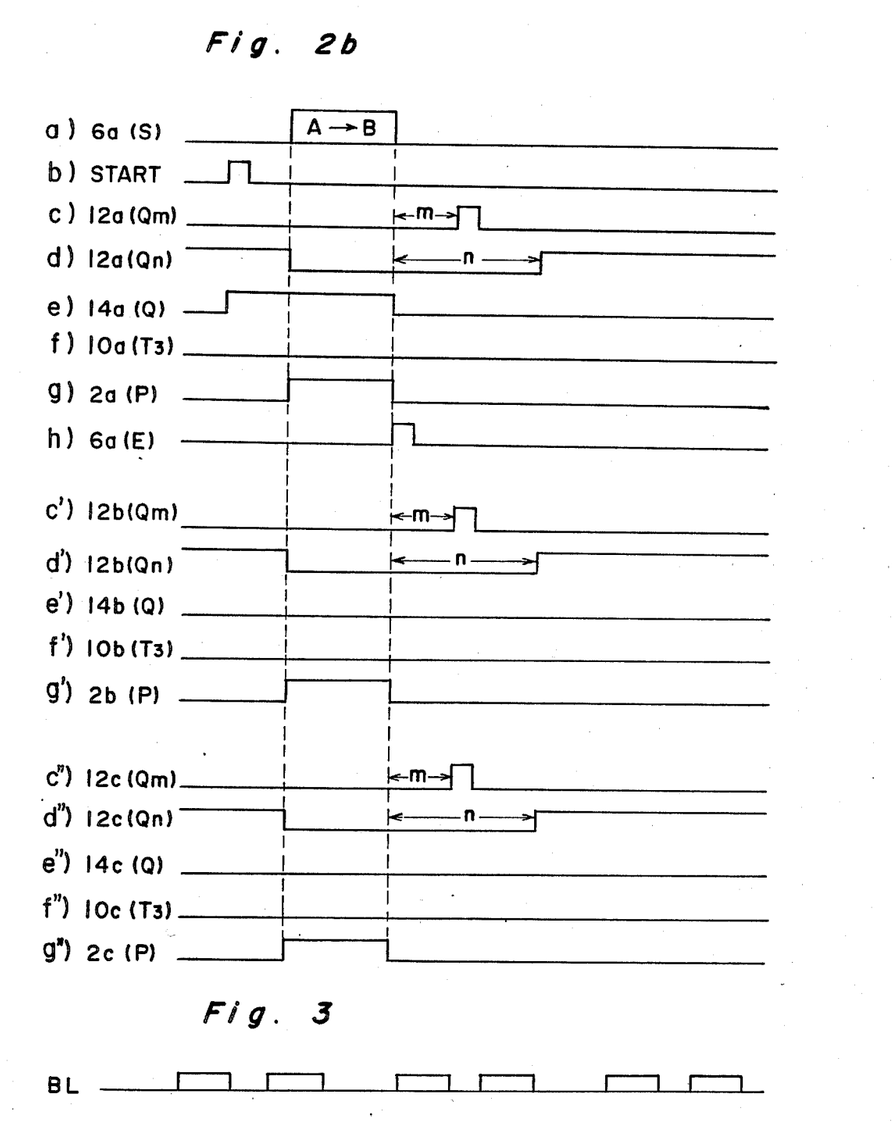
FIG. 2b is a graph similar to FIG. 2a, but obtained when the data transmission has failed.
FIG. 3 is a graph showing packets transmitted on a bus line.

Next, the operation of the data transmission system according to the present invention will be described with reference to FIG. 2a showing a case when the data transmission is done properly and FIG. 2b showing a case when the data transmission is failed. In each of FIGS. 2a and 2b, waveforms a, b, c, and so on are observed in station A, waveforms a', c', d' and so on are observed in station B, and waveforms c", d", e" and so on are observed in station C.

It is assumed that the data sending that took place previously was quite a long time ago and, therefore, counter 8a has now counted up to n. Thus, decoder 12a is now producing a HIGH level signal from its output Qn (waveform d). It is now required to sent a data in a packet from station A to station B. Therefore, the packet to be sent from station A includes an address data of "0001". To initiate the data sending, a packet, that is a combination of various data, including address data and information data, in a certain format, is prepared in data transmitter 6a in accordance with a control signal from, e.g., control circuit 10a. And then, the start switch is turned on to provide a START signal (waveform b) to AND gate 16a. At this time, since the output Qn is producing a HIGH level signal, the START signal is transmitted through AND gate 16a and OR gate 20a to set terminal S of flip-flop 14a. Accordingly, flip-flop 14a produces from its output terminal Q a HIGH level signal (waveform e) which serves as a transmit command signal (TCS). Accordingly, data transmitter 6a generates from its output terminal S a packet (waveform a) which is sent along bus line BL.

When a packet is present on bus line BL, carrier sensor 2 in every station, even in station A, produces a HIGH level signal (waveforms g, g', g"). Accordingly, by the leading edge of the HIGH level signal from carrier sensor 2, counter 8 is reset to change the output from Qn terminal from HIGH to LOW level signal (waveform d). At this time, since both terminals Qm and Qn are producing a LOW level signal, no signal will be transmitted through AND gates 16 and 18 and, therefore, no TCS will be produced from flip-flop 14.

Also, since the packet is applied to receiver 4 in every station, receiver 4 compares the address provided in the packet with the address stored in the receiver. When the address in the packet matches with the stored address, the information data in the packet is further sent to control circuit 10 for the control of the apparatus that is coupled to the station. In the present exemplification, the destination of the packet is the station B. Thus, receiver 4b is so activated as to extract the information data in the packet and send it to control circuit 10b. In control circuit 10b, the information data contained in the packet is detected. Thus, it produces from its output T3 a receipt signal indicating that the information signal is properly received. The receipt signal is applied to both AND gate 18b and data transmitter 6b. In response to the receipt of the receipt signal, data transmitter 6b prepares the answer back signal, ready to be sent in response to the TCS signal from flip-flop 14b. Also, when the receipt signal is produced, since AND gate 18b is disabled by a LOW level signal from the output Qm of decoder 12b, the receipt signal is blocked at AND gate 18b.

When the sending of the packet ends, data transmitter 6a produces an end signal (waveform h) which is applied to timer 5a for starting the count up from zero and also to the reset terminal R of flip-flop 14a. Thus, the TCS disappears. Also, in response to the trailing end of the packet, the carrier sensor 2, in each station, produces a LOW level signal (waveform g). Thereupon, the counter 8 starts to count from zero. When the counter 8 has counted up to m, the decoder 12 produces a HIGH level signal (waveforms c, c' and c") from its output Qm, thereby enabling the AND gate 18. When AND gate 18b is enabled, the receipt signal from output T3 is transmitted through AND gate 18b and OR gate 20b to flip-flop 14b, thereby setting the flip-flop 14b. Thus, flip-flop 14b produces the transmit command signal (TCS) from its Q terminal to data transmitter 6b. Accordingly, data transmitter 6b generates from its output terminal S the answer back signal (waveform a') which is sent along bus line BL. The answer back signal is applied to the receiver 4 in every station. When receiver 4a in station A receives the answer back signal, timer 5a stops counting. The counted amount is detected in receiver 4a whether it is between the m counts and n counts or whether it is greater than n count. When the counted amount in timer 5a is between the m counts and n counts, it is so recognized that the signal just received is not the packet carrying the information data, but it is the answer back signal.

It is to be noted that since timer 5a and counter 8a start counting at the same time, only one counter may be provided for these two timer and counter.

Thereafter, when counter 8 has counted up to n, the decoder 12 produces a HIGH level signal (waveforms d, d' and d'') from its output Qn, thereby enabling the AND gate 16. Thus, after counting up to n in counter 8, a packet can be sent out from any station by a START signal.

As apparent from the above, the answer back signal is produced with a time interval of about m counts, more specifically, between the time lengths of m counts and n counts from the end of the packet. It it is required to produce a packet carrying an information data, it is necessary to wait more than n counts from the end of the previous data transmitted through bus line BL. Therefore, when it is required to transmit the packets at the highest rate as possible, the packet and the answer back signals appear alternately on the bus line, as indicated in FIG. 3, with different time intervals. Since the answer back signal can be acknowledged merely by the time interval between the packet and the aswer back signal, it is necessary to provide only a timer 5 in each station. It is not necessary to provide, in each station, an information data storage for temporarily storing the information data to be sent, nor a comparator for comparing the stored data with the information data contained in the answer-back. Therefore, instead of the information data storage and the comparator, each station has timer 5 for counting the time interval between the trailing edge of the packet which has been sent from that station and the leading edge of the next signal.

Referring to FIG. 2b, when the station B fails to receive the packet from the station A, control circuit 10b produces no receipt signal from its terminal T3. Therefore, data transmitter 6b produces no answer back signal. In this case, counter 8 continues to count up to n. Thus, it is possible to sent a next data from any station upon supply of a START signal to the set terminal S of flip-flop 14a.

According to the one embodiment, n is selected to be equal to 10 and m is selected to be equal to 3.

Figure 4:
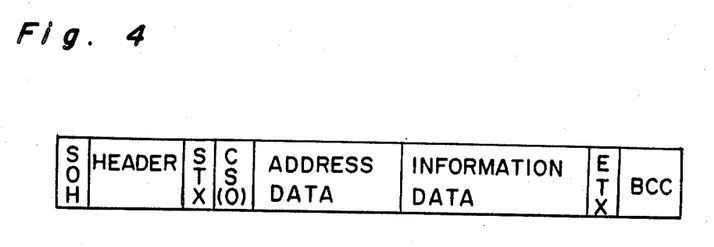
FIGS. 4 and 5 are diagrams showing a format of a packet according to the present invention.
Figure 5:
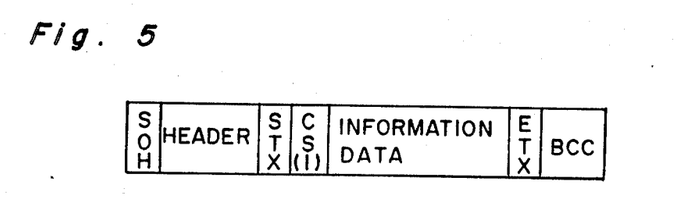

Referring to FIGS. 4 and 5, a format of a packet for sending an information data is shown. The format comprises an SOH data which indicates that the following data is a header. The header is defined by a plurality of bits used for taking a synchronization between the signal in the packet and the reading operation to be carried out in the receiving station. Next is an STX data which indicates that the following data is about address defined by a CS data and, if required, the actual address data. When the CS data is "0", it means that the destination of the packet is a particular station as represented by the following address data (FIG. 4). When the CS data is "1", it means that the destination of the packet is every station. In this case, no particular address is provided (FIG. 5). Then comes an information data which carries command information, such as "turn the power on" or any other data. Next is ETX data which indicates the end of the information data. Finally, BCC data is added for the detection of an error in the packet.

Referring to FIG. 6, a circuit for receiving the packet having the format indicated in FIGS. 4 and 5 is shown. The circuit is provided, for example, in receiver 4 shown in FIG. 1. The circuit comprises a detector 30 for detecting SOH data, header, STX data, CS data, ETX data and BCC data. Detector 30 is connected to a comparator 36 which is coupled with an address memory 34 stored with an address of the station in which the circuit is provided. The output of comparator 36 is connected to a read controller 32 which is also connected to detector 30. The output of read controller 32 is connected to a data register 38 which stores the information data, and sends it to a further processing stage of the circuit, such as a control circuit 10 shown in FIG. 1. The data applied to detector 30 is also applied to comparator 36 and data register 38.

Upon receipt of the packet from the bus line, detector 30 first detects the header for taking an initial synchronization between the pulses in the packet and the pulses in the receiving station. The manner for taking the synchronization will be described later in connection with FIGS. 10-13. Then detector 30 detects the CS data.

If the CS data is "1", detector 30 provides a signal to read control 32 which then provides a read command signal to data register 38 for reading the information data which will be provided immediately after the CS data.

If the CS data is "0", detector 30 provides a signal to comparator 36 which is then activated to receive the address data from the bus line and compares it with the address stored in address memory 34. If the address data coincides with the address stored in memory 34, comparator 36 provides a signal to read control 32. Then, in the same manner as the above, read control 32 provides a read command signal to data register 38 for reading the information data which will be provided immediately after the address data.

Figure 7:
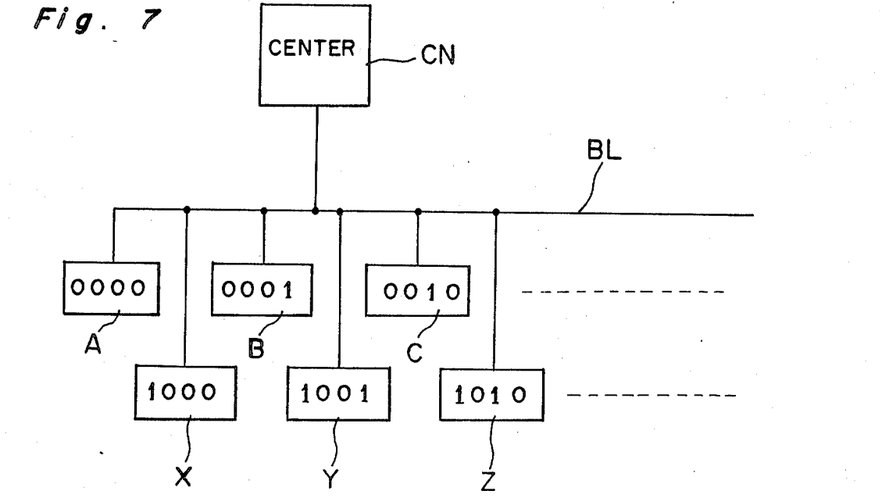
FIG. 7 is a block diagram of a data transmission system of the present invention with two different groups of stations.

Referring to FIG. 7 a block diagram of a data transmission system with two different groups of stations is shown. Each of the stations A, B and C in the first group has an address which starts with 00, and each of the stations X, Y and Z in the second group has an address which starts with 10. In this manner, the first two digits are used for designating a group. The stations A, B and C are provided, for example, for controlling different lights, and the stations X, Y and Z are provided, for example, for controlling different air conditioners. In the system of FIG. 7, all the stations are connected to each other by bus line BL, which is further connected to a center station CN.

Figure 8A:
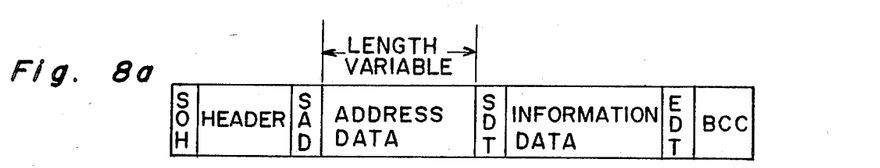
FIGS. 8a to 8d are diagrams showing another format of a packet according to the present invention.
Figure 8B:
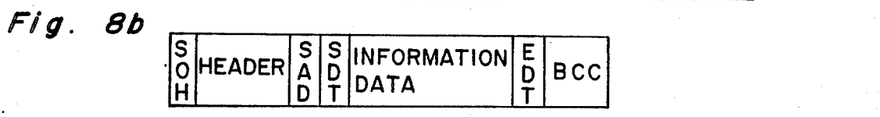
Figure 8C:
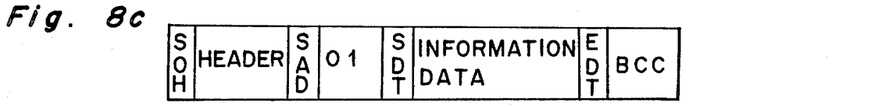
Figure 8D:
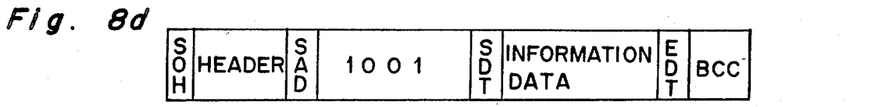

Referring to FIGS. 8a–8d, a format of a packet for sending an information data particularly for the system of FIG. 7 is shown. The format comprises an SOH data which indicates that the following data is a header. Next is an SAD data which indicates that the following data is the address data. If the packet is to be sent to a particular station, a full length of the address data is provided in the area for depositing the address data (FIG. 8a). If the packet is to be sent to all the stations in a certain group, the digits designating the group, e.g., the first two digits in the above given example, is provided in the area for depositing the address data (FIG. 8c). If the packet is to be sent to all the stations, no address is provided in the place for depositing the address (FIG. 8b). Then comes an information data which carries command information, such as "turn the power on" of any other data. Next is EDT data which indicates the end of the information data. Finally, BCC data is added for the detection of an error in the packet.

Figure 9:
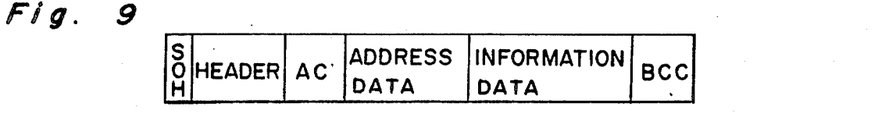
FIG. 9 is a diagram showing yet another format of a packet according to the present invention.

Referring to FIG. 9, another format of a packet is shown. In the format of FIGS. 8a-8d, SAD data and SDT are provided, respectively, for the indication of the leading and trailing ends of the address data. In the format of FIG. 9, however, AC data is provided at the leading end of the address data. AC data carries the data indicating the length of the address data.

The circuit of FIG. 6 can be used for analyzing the format shown in FIGS. 8a-8d, or the format shown in FIG. 9. For analyzing the format of FIG. 9, a decoder is further connected between detector 30 and read control 32. Thus, when detector 30 detects AC data, the decoder receives the AC data and provides a length signal indicating the length of the address data to read control 32. Thus, data register 38 stores the address data in the length represented by the length signal.

Figure 10:
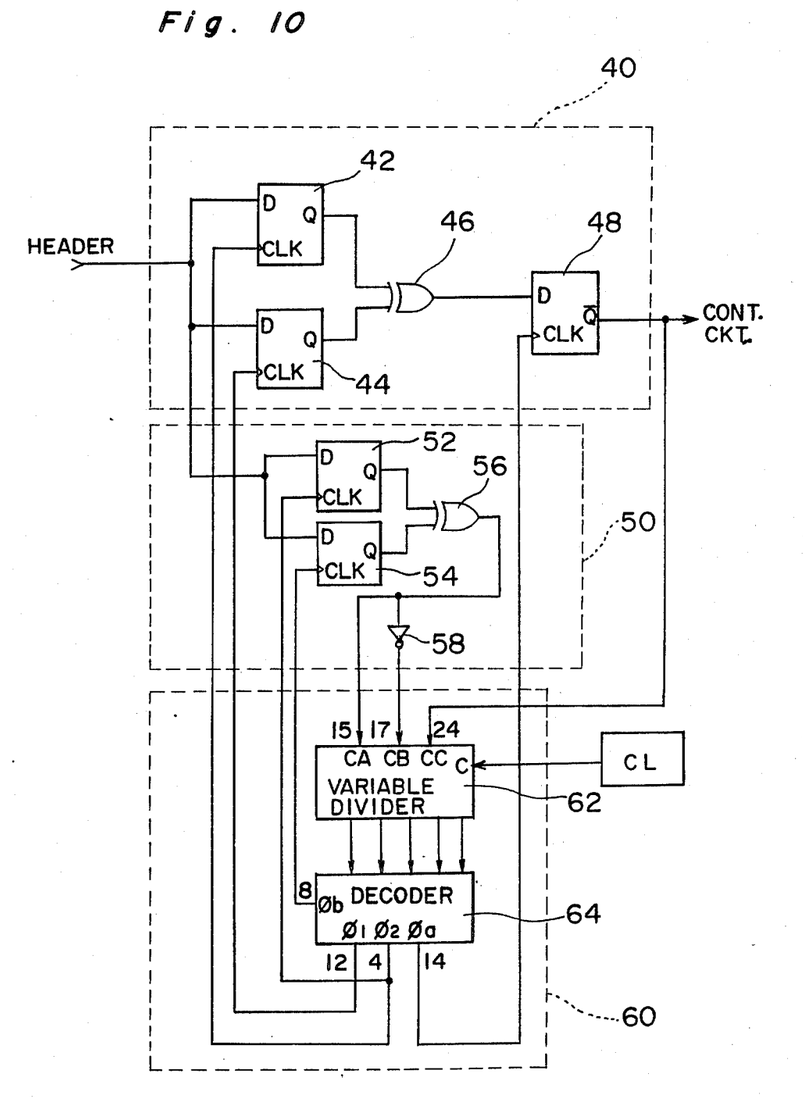
FIG. 10 is a circuit diagram of a synchronizer employed in the receiver for taking an initial synchronization between the data obtained from the bus line and the operation carried out in the receiving station.

Referring to FIG. 10, an initial synchronization circuit is shown for taking an initial synchronization between the carrier pulses in the packet and the driving pulses in the local station. An example of the initial synchronization circuit is disclosed in Japanese Patent Publication (unexamined) No. 58-223944. Before describing the circuit of FIG. 10, the carrier pulses for carrying the data in the packet will be described first.

Figure 11:
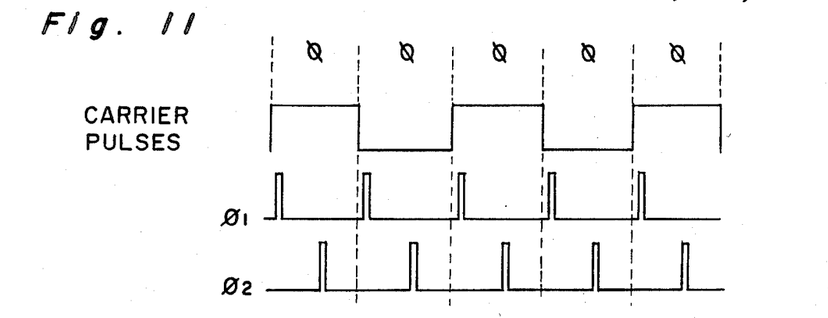
FIG. 11 is a graph showing a case in which the received data is in a synchronized relationship with clock pulses $\phi 1$ and $\phi 2$.
Figure 12:
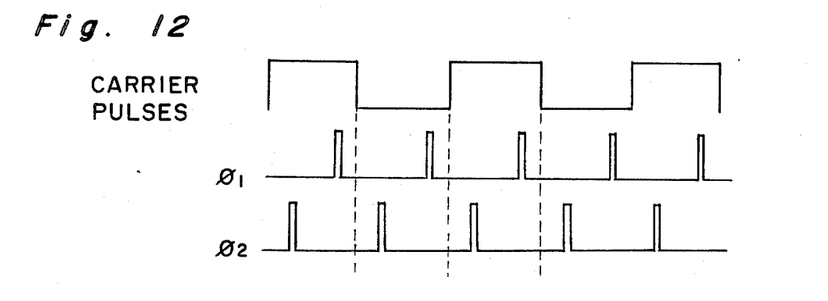
FIG. 12 is a graph similar to FIG. 11, but showing a case in which the received data is in an asynchronous relationship with the clock pulses $\phi 1$ and $\phi 2$.
Figure 15:
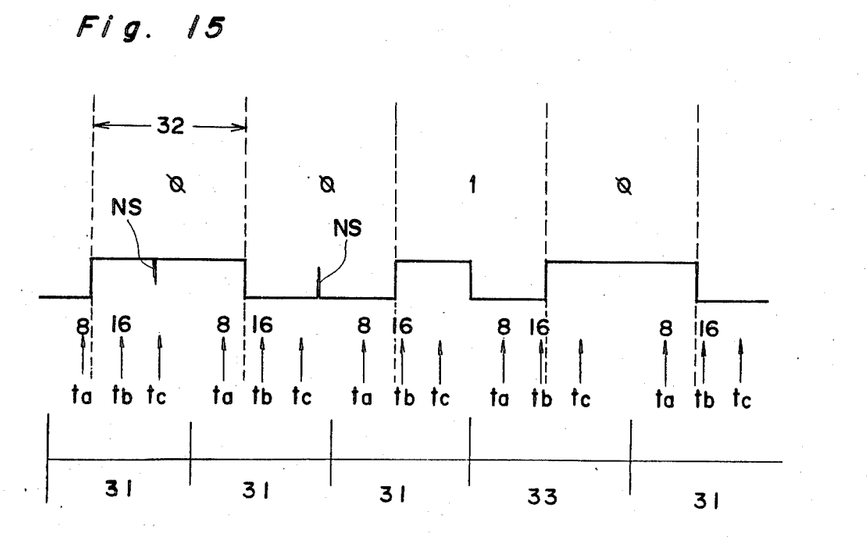

As the carrier pulse, a biphase code is employed. In the biphase code, a binary "1" is represented by a transition from the "1" to the "0" level, or from the "0" to the "1" level, in the middle of a bit, and a binary "0" is represented by no transition during one bit. Also, in the biphase code, the level always changes from the "1" to the "0", or from the "0" to the "1" level at the end of each bit. For example, the biphase code shown in FIG. 15 represents a binary signal of "0010". When the initial synchronization is obtained between the carrier pulses and the driving pulses $\phi 1$ and $\phi 2$, the driving pulses $\phi 1$ and $\phi 2$ and the transition point appear in the order of driving pulse $\phi 2$, the transition point, and driving pulse $\phi 1$, as indicated in FIG. 11. If the synchronization is not taken, the driving pulses $\phi 1$ and $\phi 2$ and the transition point appear in the order of driving pulse $\phi 2$, driving pulse $\phi 1$ and the transition point, as indicated in FIG. 12.

Instead of the biphase code, the Manchester code may be used, in which a binary "1" is represented by a transition from the "1" to the "0" level in the middle of a bit, and a binary "0" is a transition from the "0" to the "1" level in the middle of a bit.

These codes follow the rule such that, no matter what the signal is, there will always exist a transition point (a transition of the level from the "1" to the "0" or vice versa) after every one bit time. In other words, one bit time is the longest interval permitted without a transition. These codes are generally referred to as a phase code herein.

Referring to FIG. 10, the initial synchronization circuit comprises a first order detector 40, second order detector 50 and a driving pulse generator 60.

Driving pulse generator 60 includes a variable divider 62 having an input C for receiving a train of clock pulses, inputs CA, CB and CC for receiving a signal which determines the period length and five outputs. When the input CA receives a HIGH level signal, the obtained clock pulses are divided by 15 clock pulses. That is, when the input CA receives a HIGH level signal, five outputs will produce the binary coded decimal (BCD) signals from 0 to 14, repeatedly. When the input CB receives a HIGH level signal, the clock pulses are divided by 17 clock pulses. Thus, five outputs will produce the BCD signals from 0 to 16, repeatedly. Similarly, when the input CC receives a HIGH level signal, the clock pulses are divided by 24 clock pulses. Thus, five outputs will produce the BCD signals from 0 to 23, repeatedly.

Driving pulse generator 60 also includes a decoder 64 which receives the five outputs from variable divider 62 and has four outputs $\phi 1$, $\phi 2$, $\phi a$ and $\phi b$: the output $\phi 1$ produces a pulse when the five inputs receive the BCD signal equal to 14; and the output $\phi b$ produces a pulse when the five inputs receive the BCD signal equal to 8.

The first order detector 40 is provided for detecting the order such that the driving pulse $\phi 2$, the transition point, and driving pulse $\phi 1$ appear in said order. The detector 40 includes D flip-flops 42, 44 and 48 and an EXCLUSIVE OR gate 46. The D flip-flops 42 and 44 have their D input so connected as to receive the header. A clock input CLK of D flip-flop 42 is connected to output $\phi 2$ of decoder 64, and a clock input CLK of D flip-flop 44 is connected to output $\phi 1$ of decoder 64. The Q outputs of D flip-flops 42 and 44 are connected to EXCLUSIVE OR gate 46 which is in turn connected to D input of D flip-flop 48. The D flip-flop 48 has its clock input CLK connected to output $\phi a$ of decoder 64 and its $\overline{Q}$ output connected to the input CC of variable divider 62, and also to read control 32 (FIG. 6).

The second order detector 50 is provided for detecting the order such that the driving pulse $\phi 2$, the transition point, and driving pulse $\phi b$ appear in said order. The detector 50 includes D flip-flops 52 and 54, an EXCLUSIVE OR gate 56 and an inverter 58. The D flip-flops 52 and 54 have their D input so connected as to receive the header. A clock input CLK of D flip-flop 52 is connected to output $\phi 2$ of decoder 64, and a clock input CLK of D flip flop 54 is connected to output $\phi b$ of decoder 64. The Q outputs of D flip-flops 52 and 54 are connected to EXCLUSIVE OR gate 56. The output of EXCLUSIVE OR gate 56 is connected directly to input CA of variable divider 62, and also through an inverter 58 to input CB of variable divider 62.

Figure 13:
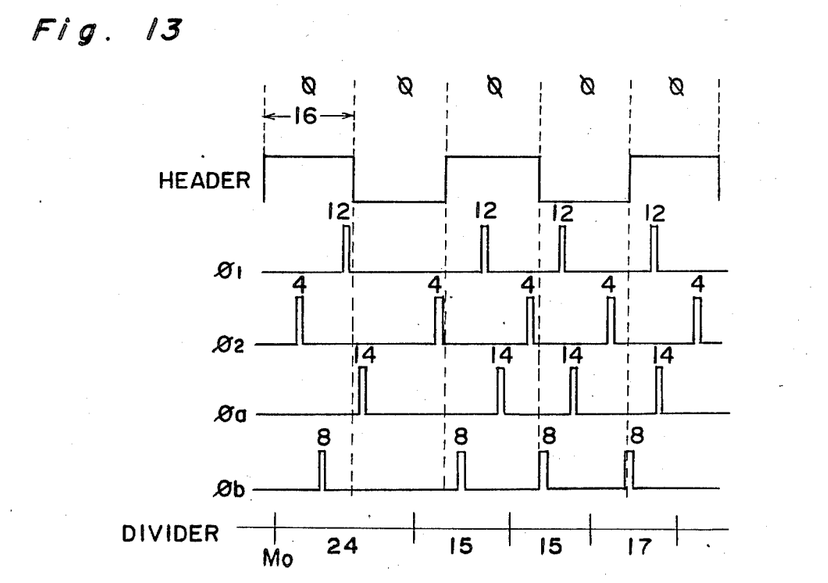
FIG. 13 is a graph showing the operation of the circuit shown in FIG. 10.

Next, the operation of the initial synchronization circuit will be described. As indicated in FIG. 13, the header received from the bus line is defined by HIGH and LOW level signals appearing alternately, and each HIGH or LOW level has a duration equal to 16 pulses of the clock pulse. It is assumed that divider 62 starts counting from zero at time MO. When divider 62 has counted up to four, a pulse 02 is produced. Similarly, when divider 62 has counted up to eight, twelve or fourteen, a pulse $\phi b$, $\phi 1$ or $\phi a$ is produced. As apparent from FIG. 13, pulses $\phi 2$ and $\phi 1$ are produced during the first HIGH level period, which means that the header is not synchronized with pulses $\phi 2$ and $\phi 1$. In this case, D flip-flop 42 produces a HIGH level signal from its Q output in response to the pulse $\phi 2$, and D flip-flop 44 also produces a HIGH level signal from its Q output in response to the pulse φ1. Accordingly, EXCLUSIVE OR gate 46 produces a LOW level signal indicating that the header signal is not synchronized with pulses φ1 and φ2. Thus, when a pulse φa is produced, D flip-flop 48 produces a HIGH level signal from its $\overline{Q}$ terminal, which is applied to the CC terminal of variable divider 62. Thus, divider 62 is in the mode to count 24 clock pulses, and it will be reset to zero after counting up to 23.

When divider 62 is reset to zero, it starts to count up again. In the same manner as described above, pulse φ2, φb, φ1 or φa will be produced when counter 62 has counted up to four, eight, twelve, or fourteen. This time, the driving pulse φ2, the second transition point of the header, and driving pulse φ1 appear in this order. In other words, the driving pulse φ2 is produced while the header is in the LOW level, and the driving pulse φ1 is produced while the header is in the HIGH level. Thus, the Q output of D flip-flop 42 produces a LOW level signal, and the Q output of D flip-flop 44 produces a HIGH level signal. Thus, EXCLUSIVE OR gate 46 produces a HIGH level signal, thereby producing a LOW level signal from $\overline{Q}$ terminal of D flip-flop 48. Thus, no HIGH level signal is supplied to CC terminal of variable divider 62. At this time, since the second transition point of the header occurs between the pulses φ2 and φb, D flip-flop 52 stores a LOW level signal in response to the pulse φ2, and D flip-flop 54 stores a HIGH level signal in response to the pulse φb. Thus, EXCLUSIVE OR gate 56 produces a HIGH level signal, thereby applying a HIGH level signal to CA terminal, and a LOW level signal to CB terminal. Thus, variable divider 62 is now in a mode to count 15 clock pulses, and it will be reset to zero after counting up to 14.

When divider 62 is reset to zero, it starts to count up again. When counter 62 has counted up to four, eight, twelve, or fourteen, pulse φ2, φb, φ1 or φa will be produced. At this time, the driving pulse φ2, the third transition point of the header, and driving pulse φ1 appear in this order. Thus, EXCLUSIVE OR gate 46 produces a HIGH level signal, thereby producing a LOW level signal from $\overline{Q}$ terminal of D flip-flop 48. Thus, no HIGH level signal is supplied to CC terminal of variable divider 62. Also, since the third transition point of the header occurs between the pulses φ2 and φb, a HIGH level signal is applied to CA terminal in the same manner described above. Thus, variable divider 62 is now in a mode to count 15 clock pulses, and it will be reset to zero after counting up to 14.

Divider 62 is reset again and starts to count up again. When counter 62 has counted up to four, eight, twelve, or fourteen, pulse φ2, φb, φ1 or φa will be produced. At this time, the driving pulse φ2, the fourth transition point of the header, and driving pulse φ1 appear in this order. Thus, no HIGH level signal is supplied to CC terminal of variable divider 62. Since the fourth transition point of the header occurs after both pulses φ2 and φb (the comparison is taken at the step-up edge of the pulse) are produced, a LOW level signal is produced from EXCLUSIVE OR gate 56 and, thus, a HIGH level signal is applied to CB terminal. Thus, variable divider 62 is now in a mode to count 17 clock pulses, and it will be reset to zero after counting up to 16.

In this manner, the timing for generating the driving pulses φ1 and φ2 is controlled so that these pulses synchronize with the header. The driving pulses φ1 and φ2 will be used for processing the signal in the packet in the further stage.

Figure 14:
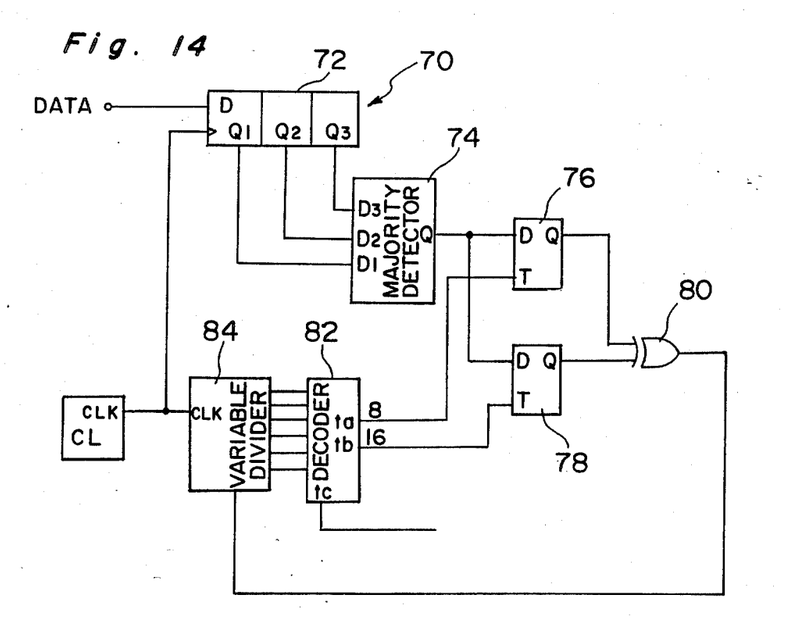
FIG. 14 is a circuit diagram of a maintaining circuit for maintaining the synchronized relationship between FIG. 15 is a graph showing the operation of the circuit shown in FIG. 14.

Referring to FIG. 14, a maintaining circuit 70 for maintaining the synchronized relationship between the received data and the operation of the receiving station is shown. The maintaining circuit comprises 3-bit shift register 72, majority detector 74, D flip-flops 76 and 78, an EXCLUSIVE OR gate 80, decoder 82, and variable divider 84.

Shift register 72 is defined by three cells and receives data of the packet transferred from the bus line. The data at this stage is in the biphase code and its one bit length is equal to 32 clock pulses. The shift register temporarily stores and transfers data in response to the clock pulse. Three outputs Q1, Q2 and Q3 of shift register 72 are connected to three inputs D1, D2 and D3, respectively, of majority detector 74. The signal representing the majority, which may be either a HIGH or LOW level signal, is produced from its output Q and being sent to D input of D flip-flops 76 and 78. The Q outputs of D flip-flops 76 and 78 are connected to EXCLUSIVE OR gate 80 which is in turn connected to variable divider 84.

Variable divider 84 receives the clock pulses and divides them by 31 clock pulses when EXCLUSIVE OR gate 80 produces a HIGH level signal, and 33 clock pulses when gate 80 produces a LOW level signal. Thus, when variable divider 84 receives a HIGH level signal from gate 80, five output terminals thereof will produce the binary coded decimal (BCD) signals from 0 to 30, repeatedly, and when it receives a LOW level signal, it produces BCD signals from 0 to 32. Decoder 82 has outputs ta, tb and tc in which outputs ta an tb are used. The output ta produces a HIGH level signal when decoder 82 receives BCD signal representing 8, and output tb produces a HIGH level signal with decoder 82 receives BCD signal representing 16. The outputs ta and tb are connected to D flip-flops 76 and 78, respectively.

Next, the operation of the maintaining circuit 70 will be described.

The data is stored in shift register 72 with the length equal to 3 clock pulses, at a time. If the data stored in the three cells are all HIGH, or two HIGHs and one LOW, majority detector 74 produces a HIGH level signal. If the data stored in the three cells are all LOW, or two LOWs and one HIGH, majority detector 74 produces a LOW level signal. By the use of majority detector 74, a noise signal NS (FIG. 15) of one clock pulse length or shorter can be eliminated. The signal produced from majority detector 74 is sampled in D flip-flop 76 when decoder 82 produces a pulse ta from its output ta, and also sampled in D flip-flop 78 when decoder 82 produces a pulse tb from its output tb. To maintain the synchronization, it is necessary to locate the transition point of data from the "1" to the "0" level, or from the "0" to the "1" level close to the pulse tb.

When the transition point is located between the pulses ta and tb, D flip-flops 76 and 78 stores different level signals. For example, in the case represented by the left most dotted vertical line in FIG. 15, D flip-flop 76 stores a LOW level signal in response to the pulse ta and, D flip-flop 78 stores a HIGH level signal in response to the pulse tb. Thus, EXCLUSIVE OR gate 80 produces a HIGH level signal, thereby setting variable divider 84 in such a mode as to divide the clock pulses by 31 pulses. Thus, after counting 31 pulses, variable divider 84 is reset and it starts to count from zero again.

In this manner, as long as the transition point is located between the pulses ta and tb, variable divider 84 is in the mode to count 31 pulses.

Since the bit length of the data is equal to 32 clock pulses, whereas the variable divider 84 divides the clock pulses by 31 clock pulses, the transition point as indicated by a dotted line in FIG. 15 will be shifted towards the pulse tb. Thus, after a number of bits, the transition point will be located outside the interval between the pulses ta and tb, close to the pulse tb. When this happens, the maintaining circuit 70 operates in the following manner.

In response to the pulses 76 and 78, D flip-flops 76 and 78 store the same level signal. For example, in the case of the third bit of the data, pulses ta and tb are produced before the end of the third bit, i.e., before the transition. Thus, in response to the pulse ta, D flip-flop 76 stores a LOW level signal, and in response to the pulse tb, D flip-flop 78 also stores a LOW level signal. Accordingly, EXCLUSIVE OR gate 80 produces a LOW level signal, thereby setting variable divider 84 in such a mode as to divide the clock pulses by 33 pulses. Thus, in the next bit period, the transition will be located between pulses ta and tb, close to pulse tb. In this manner, the transition will be maintained close to the pulse tb.

Figure 16:
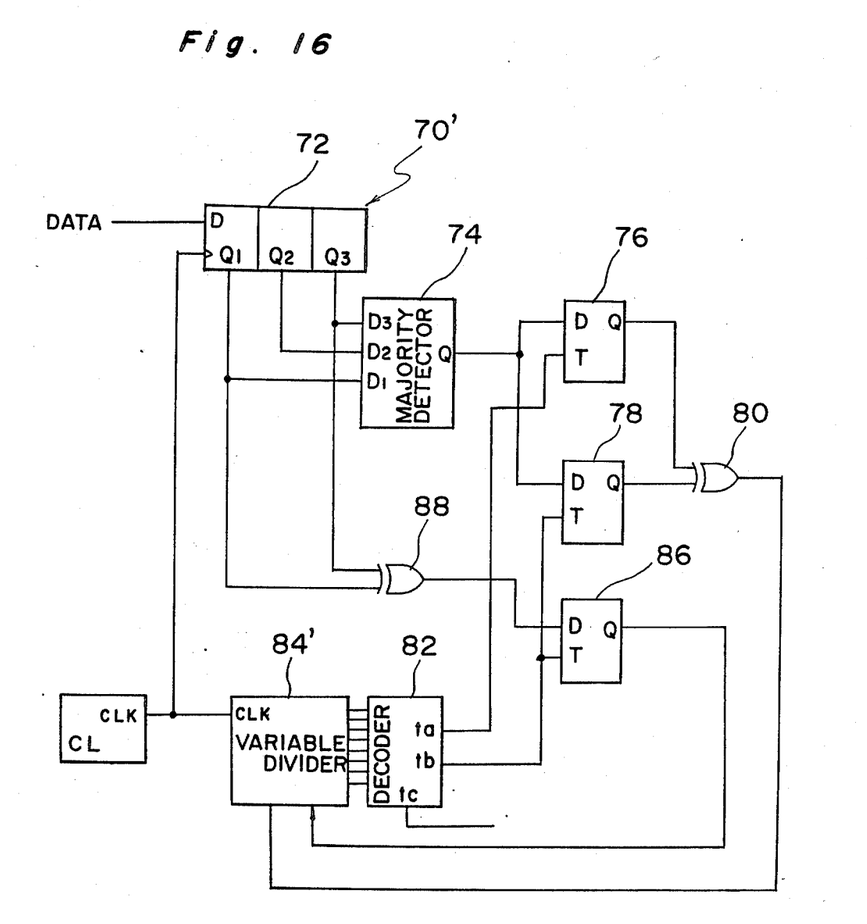
FIG. 16 is a circuit diagram similar to that shown in FIG. 14, but showing a modification thereof.

Referring to FIG. 16, a modification 70' of the maintaining circuit is shown. When compared with the maintaining circuit of FIG. 14, the modification 70' further includes an EXCLUSIVE OR gate 88 which receives signal from outputs Q1 and Q3 of shift register 72, and a D flip-flop 86 which stores the output of EXCLUSIVE OR gate 88 in response to the pulse tb. The output of D flip-flop 86 is connected to variable divider 84' which divides the clock pluses by different numbers as indicated in Table 1 below.

TABLE 1

| Output from gate 80 | LOW | HIGH | LOW | HIGH |
|---|---|---|---|---|
| Output from FF 86 | LOW | LOW | HIGH | HIGH |
| Clock Pulse Number | 35 | 29 | 33 | 31 |

The operation of the maintaining circuit of FIG. 16 is as follows. When the transition point of data from the "1" to the "0" level, or from the "0" to the "1" level is located very close to the pulse tb, the output signals produced from outputs Q1 and Q3 are different from each other, thereby producing a HIGH level signal from EXCLUSIVE OR gate 88 when the pulse tb is produced from decoder 82. Thus, D flip-flop 86 produces a HIGH level signal which is applied to variable divider 84'. At this time, if EXCLUSIVE OR gate 80 is producing a HIGH level signal indicating that the transition point is located between the pulses ta and tb, variable divider 84' is set in such a mode as to divide the clock pulses by 31 pulses. In other words, if the transition point is located between the pulses ta and tb and yet very close to pulse tb, the divider will be set in a mode to count 31 pulses, thereby in the next bit, the pulse tb is shifted towards the transition point (towards left in FIG. 15) by a small degree.

If the transition point is located outside the pulse intervals between the pulses ta and tb, but very close to the pulse tb, D flip-flop 86 produces a HIGH level signal in the same manner described above, and EXCLUSIVE OR gate 80 produces a LOW level signal. In this case, variable divider 84' is set in such a mode as to divide the clock pulses by 33 pulses. In other words, if the transition point is located outside the interval between the pulses ta and tb, but very close to pulse tb, the divider will be set in a mode to count 33 pulses, thereby in the next bit, the pulse tb is shifted towards the transition point (towards right in FIG. 15) by a small degree.

If the transition point is located between the pulses ta and tb, and not close to the pulse tb, all the outputs Q1, Q2 and Q3 will produce the same signal when the pulse tb is produced. Thus, D flip-flop 86 produces a LOW level signal, and EXCLUSIVE OR gate 80 produces a HIGH level signal. In this case, variable divider 84' is set in such a mode as to divide the clock pulses by 29 pulses. In other words, if the transition point is located between the pulses ta and tb, and not close to pulse tb, the divider will be set in a mode to count 29 pulses, thereby in the next bit, the pulse tb is shifted towards the transition point (towards left in FIG. 15) by a great degree.

Finally, if the transition point is located outside the interval between the pulses ta and tb, and not close to the pulse tb, all the outputs Q1, Q2 and Q3 will produce the same signal when the pulse tb is produced. Thus, D flip-flop 86 produces a LOW level signal, and EXCLUSIVE OR gate 80 produces a LOW level signal. In this case, variable divider 84' is set in such a mode as to divide the clock pulses by 35 pulses. In other words, if the transition point is located outside the interval between the pulses ta and tb, and not close to pulse tb, the divider will be set in a mode to count 35 pulses, thereby in the next bit, the pulse tb is shifted towards the transition point (towards right in FIG. 15) by a great degree.

Although the present invention has been fully described with reference to a preferred embodiment, many modifications and variations thereof will now be apparent to those skilled in the art, and the scope of the present invention is therefore to be limited not by the details of the preferred embodiment described above, but only by the terms of the appended claims.

What is claimed is:

1. A data transmission system having a plurality of stations and bus structure connected among the stations for sending an information data or an answer back data in a packet from one station to another station through said bus structure, each station comprising:

receiver means for receiving said packet;

acknowledge means for acknowledging that said packet of information data is directed to said station and for producing an acknowledge signal upon detection of said packet of information data directed thereto;

carrier sense means for producing a presence signal indicative of the presence of said packet on said bus structure;

counter means for counting time when said presence signal disappears, and for producing first and second time-up signals after the lapse of first and second predetermined times, respectively, from the disappearance of said presence signal, said first predetermined time being shorter than said second predetermined time;

transmitter means for preparing said packet of answer back data in response to the receipt of said acknowledge signal and for transmitting said prepared answer back data after said counter has counted said first predetermined time and before the end of said second predetermined time, said transmitter means also for preparing the packet of information data and for transmitting the prepared information data after said counter has counted said second predetermined time.

2. A data transmission system as claimed in claim 1 further comprising:
- a timer means for counting said first predetermined time from the end of said packet of information data sent from said station; and
- a judging means for judging that said packet of information data is properly sent when said station receives said packet of answer back data during the count of said timer.

3. A data transmission system as claimed in claim 2, wherein said counter and said timer is defined by the same time counting device.

4. A data transmission system as claimed in claim 1, wherein said packet of information data includes a CS data which is either a first state or a second state such that when said CS data is in said first state, no address of a destination station follows indicating that the packet is to be sent to every station, and when said CS data is in said second state, an address of a destination station follows indicating that the packet is to be sent to a particular station with said address.

5. A data transmission system as claimed in claim 4, wherein said receiver comprising:
- a detector means for detecting an address in said packet received from said bus line;
- an address memory means for storing an address of said station;
- a comparator means for comparing said address stored in said address memory means with said address obtained from said detector means and producing a read signal when said two addresses coincides with each other; and
- a register means for storing an information data when said comparator means produces said read signal.

6. A data transmission system as claimed in claim 1, wherein said packet of information data includes SAD data and SDT data, said SAD data indicating a leading end of an address data and being located in front of the address data and said SDT data indicating a trailing end of said address data and being located at the end of said address data, said SAD data and SDT data permitting various length of address data.

7. A data transmission system as claimed in claim 6, wherein said receiver comprising:
- a detector means for detecting an address in said packet received from said bus line;
- an address memory means for storing an address of said station;
- a comparator means for comparing said address stored in said address memory means with said address obtained from said detector means and producing a read signal when said two addresses coincides with each other; and
- a register means for storing an information data when said comparator means produces said read signal.

8. A data transmission system as claimed in claim 1, wherein said packet of information data includes an AC data which is located in front of an address data, said AC data carrying an information of the length of said address data.

9. A data transmission system as claimed in claim 8, wherein said receiver comprising:
- a detector means for detecting an address in said packet received from said bus line;
- an address memory means for storing an address of said station;
- a comparator means for comparing said address stored in said address memory means with said address obtained from said detector means and producing a read signal when said two addresses coincides with each other; and
- a register means for storing an information data when said comparator means produces said read signal.

10. A data transmission system as claimed in claim 1, wherein said packet is coded by a phase code having a transition point at the end of each bit, said transition point appearing at a predetermined time interval.

11. A data transmission system as claimed in claim 10, wherein said packet includes a header for taking a synchronization between pulses in said phase code and pulses for driving a station which receives said packet.

12. A data transmission system as claimed in claim 11, wherein said receiver comprising an initial synchronization circuit which comprises:
- a first driving pulse generating means for generating first driving pulses;
- a second driving pulse generating means for generating second driving pulses, said first and second driving pulses having the same time interval of pulses but with a predetermined phase difference;
- a first order detector means for detecting the order of the occurrence of said first driving pulse, said transition point and said second driving pulse in said order and for producing an in-order signal when they are in said order and out-of-order signal when they are not in said order;
- a means for changing the time interval of both of said first and second driving pulses such that when said out-of-order signal is produced, said time interval is changed so as to make said first driving pulse, said transition point and said second driving pulse in said order.

13. A data transmission system as claimed in claim 12, wherein said changing means comprises a variable divider for dividing a clock pulse at a different rate.

14. A data transmission system as claimed in claim 12, wherein said first and second driving pulse generating means comprises a decoder coupled to said variable divider for generating said first driving pulse upon detection of m-th clock pulse produced from said variable divider in each divided period, and said second driving pulse upon detection of n-th clock pulse produced from said variable divider in each divided period, in which n is greater than m.

15. A data transmission system as claimed in claim 10, further comprising a maintaining circuit which comprises:
- a third driving pulse generating means for generating third driving pulses;
- a fourth driving pulse generating means for generating fourth driving pulses, said third and fourth driving pulses having the same time interval of pulses but with a predetermined phase difference;
- a second order detector means for detecting the order of the occurrence of said third driving pulse, said transition point and said fourth driving pulse in said order and for producing an in-order signal when they are in said order and out-of-order signal when they are not in said order;
- a means for changing the time interval of both of said third and fourth driving pulses such that when said out-of-order signal is produced, said time interval is changed so as to make said third driving pulse, said transition point and said fourth driving pulse in said order.

16. A data transmission system as claimed in claim 15, further comprising a majority detecting means which comprises:

a shift register for storing a predetermined length of said phase code and being transferred sequentially;

a majority detector for detecting the state of majority of said phase code and producing the detected state as representing the phase code during said predetermined length.

* * * * *